Sept. 21, 1965 H. RAUSSENDORF 3,207,230

PLOW WITH ROTARY SOIL-WORKING IMPLEMENT

Filed Dec. 9, 1963 2 Sheets-Sheet 1

HANS RAUSSENDORF
INVENTOR.

BY Karl F. Ross
AGENT

PLOW WITH ROTARY SOIL-WORKING IMPLEMENT

Filed Dec. 9, 1963 2 Sheets-Sheet 2

INVENTOR.
HANS RAUSSENDORF

BY

Karl F. Ross
AGENT

United States Patent Office 3,207,230
Patented Sept. 21, 1965

3,207,230
PLOW WITH ROTARY SOIL-WORKING IMPLEMENT

Hans Raussendorf, Vienenburg, Harz, Germany, assignor to Raussendorf & Co., G.m.b.H., Vienenburg, Harz, Germany, a limited-liability company of Germany
Filed Dec. 9, 1963, Ser. No. 329,085
Claims priority, application Germany, Mar. 7, 1963, R 25,716, R 34,628
4 Claims. (Cl. 172—67)

My present invention relates to a plow having at least one rotary soil-working implement journaled in the wake of a moldboard on a horizontal frame and driven by a convenient source of power, such as a power-take-off shaft of an associated tractor.

Such an implement may be provided with a bottom disk below a rotary carrier of earth-turning tools which serve to invert and comminute the clods loosened from the soil by the advancing plowshare, the disk smoothing the bottom of the furrow which the plowshare has cut. If, however, the implement is designed as a rotor with a vertical axis so that the disk rotates in a horizontal plane, its operation is frequently unsatisfactory even if the disk is provided with a well-defined peripheral cutting edge, the reason being that it is extremely difficult to find the exact level at which the disk edge will be neither so high above the ground as to be ineffectual nor so deeply imbedded therein as to undergo considerable vibrations with resulting undulations in the surface produced by it.

The disk, therefore, is preferably inclined to the horizontal at a small angle so that the cutting edge makes only limited contact with the soil as its lowered forward edge portion bites into the ground during forward travel. A stabilized implement of this description has been claimed per se in my copending application Ser. No. 329, 200 filed on even date herewith.

As the plowshare advances across the field, it has the tendency to compact the bottom of its own furrow and to seal the capillary pores of the soil. This is disadvantageous in that it interferes with the penetration of water into the subsoil, it being therefore the general object of my present invention to provide means for overcoming this drawback in a plow of the type referred to.

The foregoing object is realized, in accordance with my present invention, by the combination of a moldboard-supported plowshare and a disk share in which the cutting edge of the disk, particularly its lowered front portion, is disposed below the level of the point of the plowshare. According to a more specific feature, the difference in level between the two cutting formations should range between about 3 and 6 cm. for optimum results with the usual type of soil.

The disk share may be formed with an acute angle along its cutting edge, preferably ranging between 10° and 35°, which is defined by a peripheral bevel and a concave underside. This concave underside provides a rake angle greater than the small angle of inclination between the rotary axis and the vertical whereby the lower flank of the cutting edge is maintained out of contact with the soil and only its upper flank is subject to abrasion, the edge being therefore self-sharpening.

The above and other objects, features and advantages of my invention will become more fully apparent from the following detailed description of a preferred embodiment, reference being made to the accompanying drawing in which.

Figure 1:
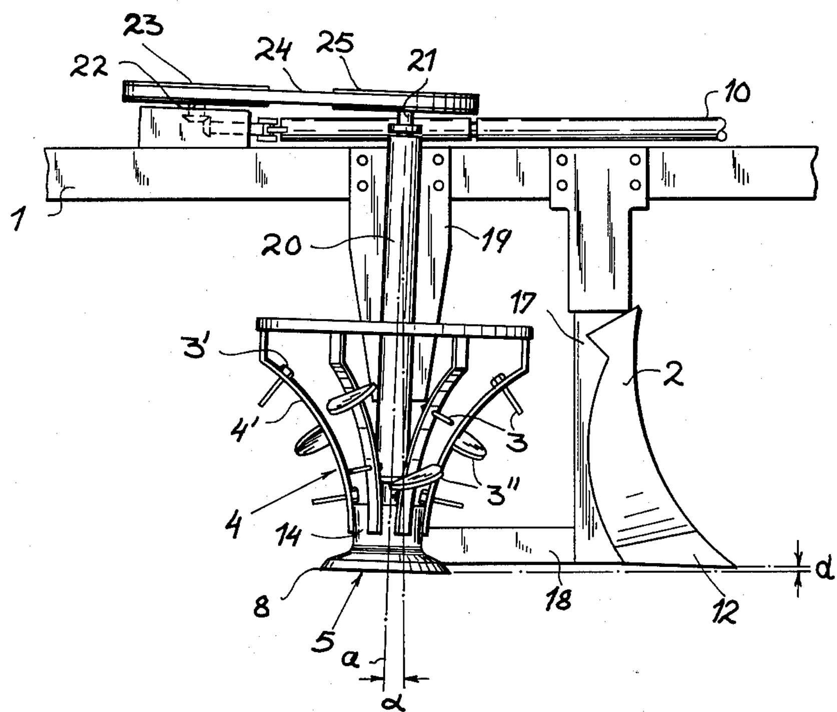
FIG. 1 is a side-elevational view of part of a tractor plow embodying the invention.
Figure 2:
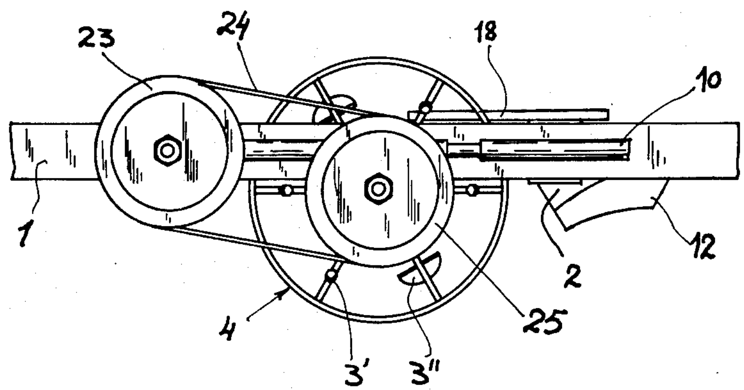
FIG. 2 is a top view of the part of the plow seen in FIG. 1.
Figure 3:
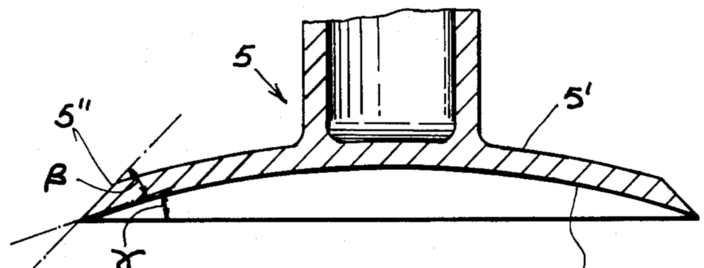
FIG. 3 is an enlarged cross-sectional view of the lower end of a rotary implement shown in FIGS. 1 and 2.
Figure 4:
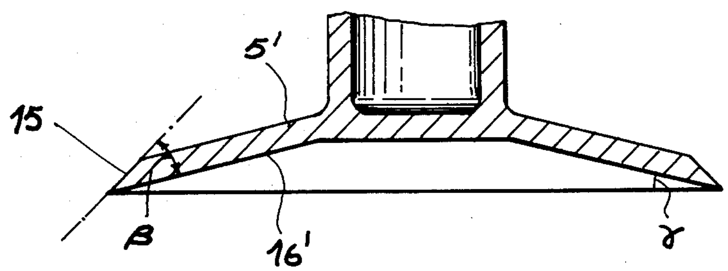
FIG. 4 is a view similar to FIG. 3, illustrating a modification.

The plow partly shown in FIGS. 1 and 2 comprises a wheel-supported frame of which there are visible only a horizontal beam 1 and a depending post 17. The lower end of the post supports a moldboard 2 with landside 18 and forwardly pointed plowshare 12. Directly behind post 17 there is provided on beam 1 a mounting plate 19 for a sleeve 20 in which a generally vertical shaft 21 is journaled for rotation about an axis *a*. This axis is rearwardly inclined, with reference to the vertical, by a small angle $\alpha$ of a preferably not less than ½° nor more than 3°. The same angle of inclination exists between the horizontal and a circular cutting edge 8 which defines the periphery of a disk share 5 at the bottom of a rotor body 3 on shaft 21. The major part of body 4, defined by concave generatrices, serves as a carrier for an array of clod-turning, mixing and disintegrating tools such as spikes 3 which, extending substantially perpendicularly to these generatrices to insure a high degree of stability, are fast-ened by nuts 3' to a set of curved staves 4' constituting the downwardly tapering portion of the rotor body. Some of these tools may also be in the shape of vanes, as illustrated at 3''. The staves 4' merge tangentially into a short cylindrical rotor portion 14 immediately above disk 5, the latter having a sloping upper surface 5' which extends from the cylinder 14 to the cutting edge 8 and terminates in a bevel 5''. The underside of disk 5 is concave, e.g., in the shape of a sphere segment (16, FIG. 3) or in the shape of a frustocone (16', FIG. 4), and defines with the generatrices 5'' of the frustoconical cutting edge an acute edge ange $\beta$ which may range between about 10° and 35°. The rake angle $\gamma$, included between the concave face 16 or 16' and the lower disk plane, is greater than the angle of inclination $\alpha$ and may range between about 10° and 20°.

Motion is imparted to shaft 21 and rotor 4 by a power-take-off shaft, extending rearwardly from a tractor not shown, which is coupled via a bevel-gear trasmission 11 with a vertical stud shaft 22 carrying a pulley 23; a V-belt 24 links the pulley 23 with a similar pulley 25 on shaft 21. Rotation is thereby imparted, preferably at a constant rate independent of travel speed, to the disk share 5 whose cutting edge 8 bites into the surface of the furrow traced by the plowshare 12.

The point of plowshare 12 is advantageously located about 3–6 cm. above the lowered front portion of cutting edge 8 whereby the latter reopens the closed capillaries of the soil to facilitate absorption and/or evaporation of moisture. Tests have shown that furrows plowed in this manner afford indeed a considerably improved water circulation as compared with those made by plows wherein the cutting point of the moldboard lay below the disk edge or at a common level therewith.

In practice, with a disk of say, 25–30 cm. in diameter and a rotor body of 40–50 cm. in height, the difference *d* in elevation between the plowshare point and the disk edge will range between about one-fourth and one-tenth of the disk diameter.

Modifications of the specific arrangement shown and described are, of course, possible without departing from the spirit and scope of my invention as defined in the claims hereunto appened.

I claim:

1. In a plow having a horizontal frame and a source of motive power on said frame, the combination therewith of a moldboard depending from said frame and a rotary soil-working implement journaled in said frame behind said moldboard, said implement being coupled with said source of power for rotation about an axis rearwardly and downwardly inclined at a small angle to the vertical, said moldboard terminating at its bottom in a single forwardly pointed plowshare having an underside sloping downwardly to its forward point, said implement terminating at its bottom in a disk share with a substantially frustoconical cutting edge disposed slightly below the level of the point of said plowshare behind said point and substantially in line therewith, said disk share having a concave bottom surface including an acute angle with the generatrices of said frustoconical cutting edge.

2. The combination defined in claim 1 wherein the difference in level between said point and the front of said cutting edge lies substantially between one-fourth and one-tenth of the disk diameter, said small angle ranging between substantially ½° and 3°.

3. The combination defined in claim 1 wherein said concave bottom surface forms along said edge a rake angle greater than said small angle.

4. The combination defined in claim 3 wherein said small angle ranges between substantially ½° and 3°, said acute angle ranging between substantially 10° and 35°, said rake angle ranging between substantially 10° and 20°, the difference in level between said cutting edge and said point ranging betwen substantially 3 and 6 cm.

References Cited by the Examiner

UNITED STATES PATENTS

| | | | |
|---|---|---|---|
| 75,578 | 3/68 | Roberts | 172—63 |
| 488,514 | 12/92 | Arnold | 172—604 |
| 1,077,288 | 11/13 | McKee | 177—604 |
| 1,729,969 | 10/29 | Shields | 172—66 |
| 2,052,802 | 9/36 | Schatz | 172—111 |
| 2,108,078 | 2/38 | Russell | 172—67 |
| 2,578,127 | 12/51 | Collins | 172—67 |

FOREIGN PATENTS

| | | |
|---|---|---|
| 349,706 | 3/22 | Germany. |
| 912,410 | 12/62 | Great Britain. |

OTHER REFERENCES

German application, 1,002,549, Pub. Feb. 14, 1957.

ABRAHAM G. STONE, *Primary Examiner.*